G. S. ENGLE.
PRIMARY BATTERY.
APPLICATION FILED MAY 5, 1914.
1,224,455.
Patented May 1, 1917.
3 SHEETS—SHEET 1.
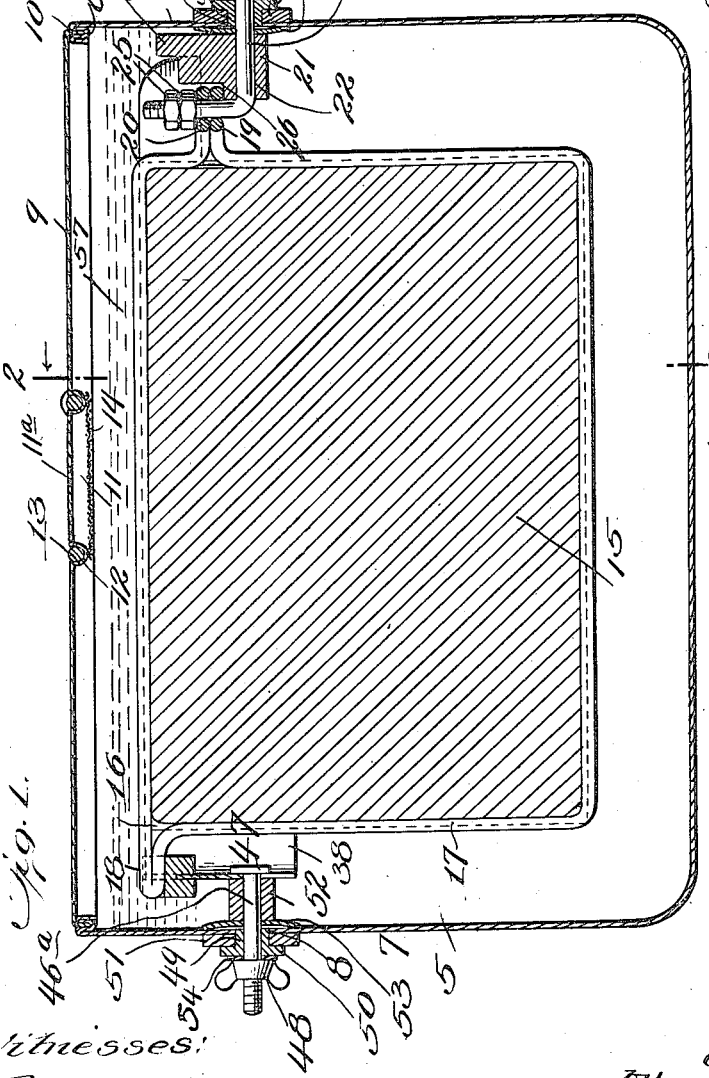

G. S. ENGLE.
PRIMARY BATTERY.
APPLICATION FILED MAY 5, 1914.
1,224,455.
Patented May 1, 1917.
3 SHEETS—SHEET 2.
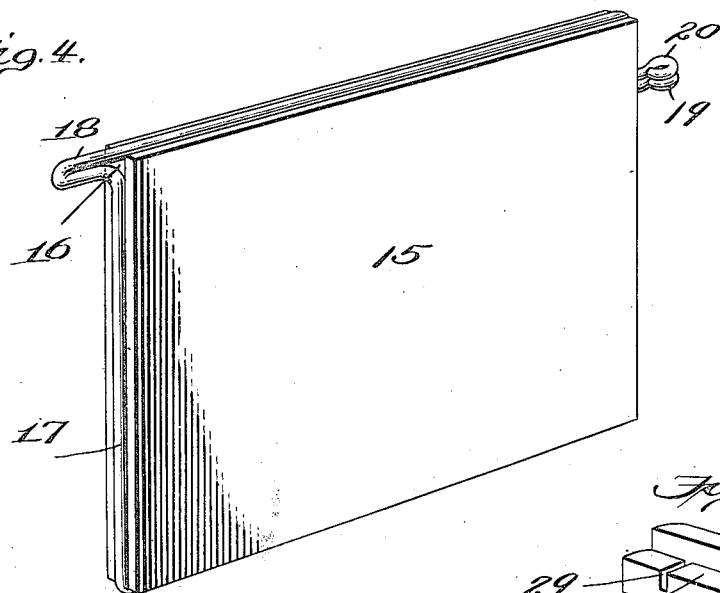
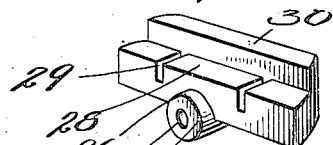
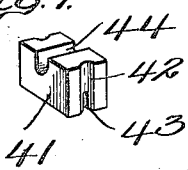
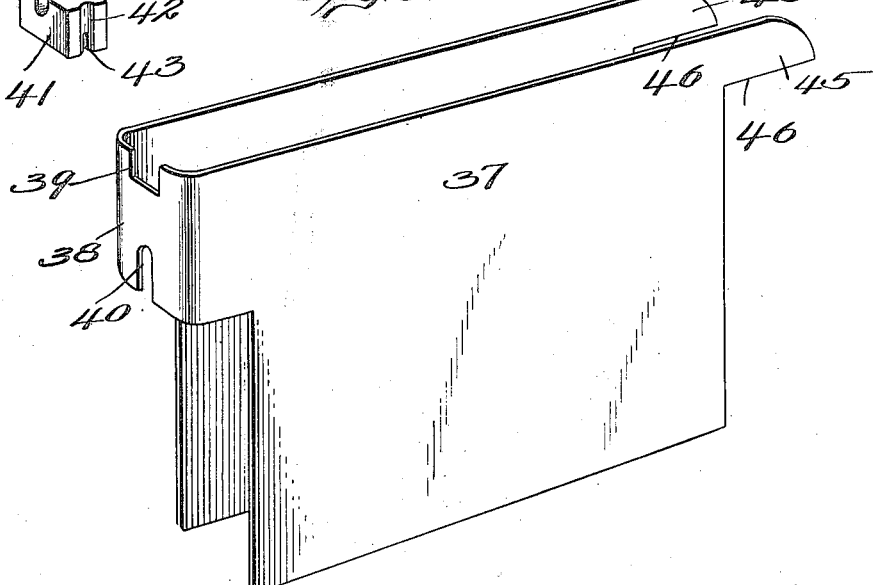
Witnesses:
G. D. Kesler
Chas. S. Hyer
Inventor
George S. Engle
by
Amos L. Dorris,
Attorney

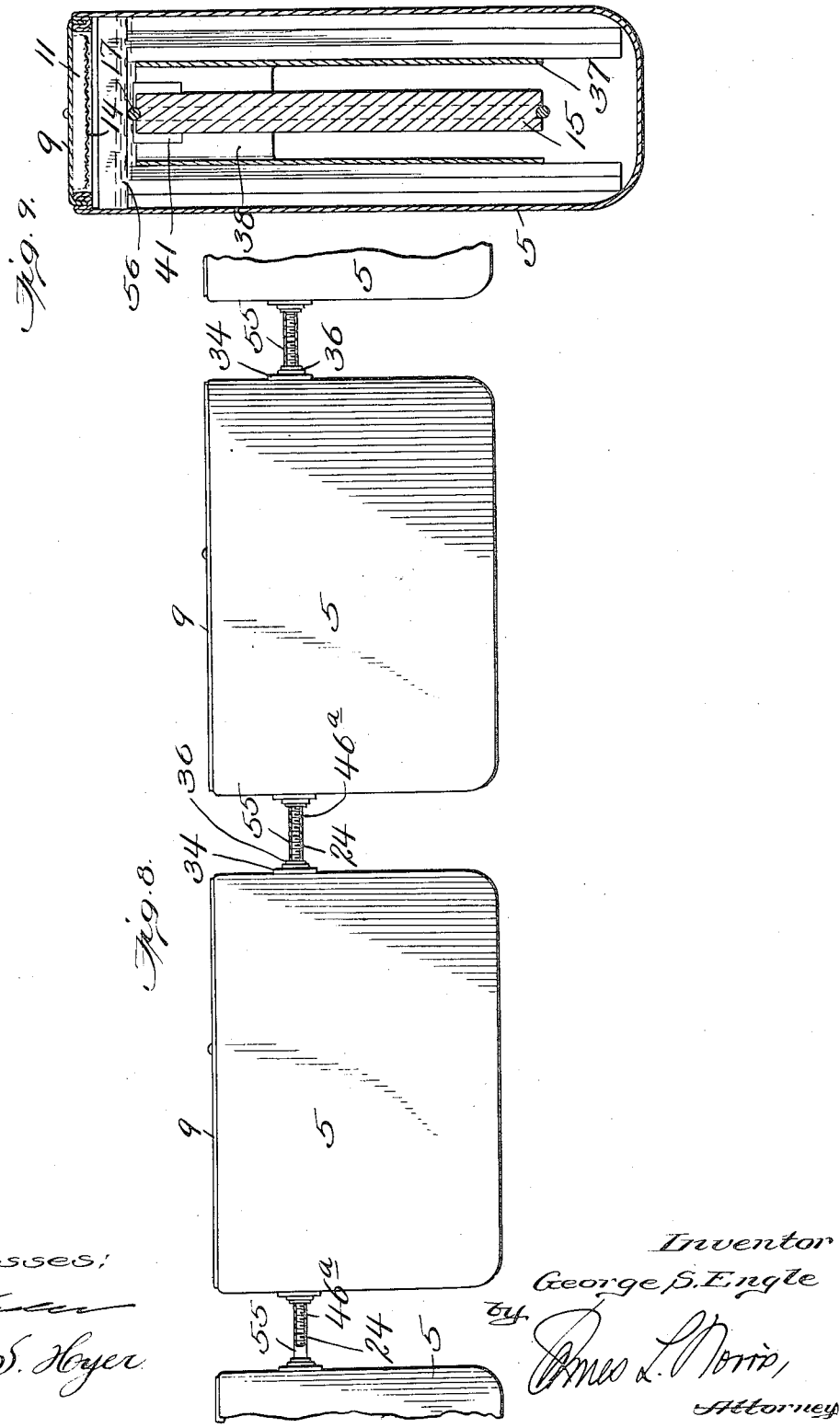

UNITED STATES PATENT OFFICE.

GEORGE S. ENGLE, OF CRANSTON, RHODE ISLAND.

PRIMARY BATTERY.

1,224,455. Specification of Letters Patent. Patented May 1, 1917.

Application filed May 5, 1914. Serial No. 836,467.

*To all whom it may concern:*

Be it known that I, GEORGE S. ENGLE, a citizen of the United States, residing at Cranston, in the county of Providence and State of Rhode Island, have invented new and useful Improvements in Primary Batteries, of which the following is a specification.

This invention relates to a primary battery, and the objects in view are to provide a cell which will have a more active chemical operation and condition; to provide means for air-venting the cell and at the same time maintain the latter liquid-tight; to provide means for attaching a cover by a simple construction that will render the cover efficiently gas-tight without a seal; to effect an advantageous operation of the battery by submerging both the elements and the terminals in the electrolyte; to construct the top and sides of the cell in a flush manner so as to render it possible to pack them very closely and to set one on top of another without interference and thereby provide for greatly increased output per cubic foot of space by permitting installation of a greater number of cells within a given space; to provide for installation of the cells in groups, end to end, by utilizing pipe connections and entirely doing away with wiring of any description, and to simplify the operation of removal or installation of the elements of a primary battery and facilitate the renewal of the negative plate by recharging if desired and found necessary.

With these and other objects and advantages in view the invention consists in the construction and arrangement of the several parts which will be more fully hereinafter described and claimed in preferred form.

In the drawings:

Figure 1 is a longitudinal vertical section of a primary battery cell embodying the features of the invention.

Fig. 2 is a transverse vertical section on the line 2—2, Fig. 1.

Fig. 3 is a top plan view showing the cover in the main broken away.

Fig. 4 is a detail perspective view of the negative element or plate.

Fig. 5 is a detail perspective view of the positive element.

Figs. 6 and 7 are detail perspective views of parts of the improved cell.

Fig. 8 is a detail elevation showing a plurality of the cells coupled in end to end relation by pipe connections.

Fig. 9 is a detail cross-sectional view similar to Fig. 2 showing the application of a separator to hold the elements in place and to render the cell readily portable without liability of lateral movement of the elements.

The numeral 5 designates a container or receptacle which is in the form of a copper box of ample depth and length but comparatively reduced in width. As clearly shown by Figs. 1, 2 and 3, the upper edge of the container is bent inwardly and then upwardly and again inwardly to provide a seat or groove 6, and the opposite ends 7 of the container at or about the center and at a suitable distance from the upper edge are formed with openings 8, one in each end for a purpose which will be presently explained. A flat closure in the form of a cover 9 having a surrounding flange 10 completes the general organization of the container, the said flange 10 of the cover 9 tightly fitting in the seat or groove 6, and after this flange has been applied in the groove the latter is adapted to be filled with any suitable sealing material to make the cell gas and liquid-tight as will be readily understood by those skilled in the art. To permit the escape of cell gases and at the same time prevent the creeping of liquid from the cell, a venting chamber 11 is formed in the center of the cover 9 and is provided with a top vent opening 11$^a$ and an annular groove 12 in which a ring handle 13 is normally disposed flush with the top surface of the said cover, the ring handle 13 being used in withdrawing the cover from the cell body or container and also in placing the said cover on the cell body. The air chamber 11 has a bottom covering 14 of copper gauze having a very fine mesh, the interstices of the gauze covering permitting the free passage or escape of gases and the inlet of air, but obstructing the passage of liquid therethrough from the interior to the exterior of the cell. It will be observed that the construction of cell body and cover as just explained provides a perfectly flush top and side for the container or the cell as a whole and the container is completely insulated from the battery circuit, as will be hereinafter described.

The elemental constituents of the cell consist of a negative plate 15 formed with a groove 16 extending completely around the edge thereof to receive a suspending or hanging means for the said element, consisting preferably of a copper wire 17 having a No. 10 gage. At the upper portion of one end of the negative element 15 the wire suspending means 17 is formed with a bent extension 18, and at the opposite extremity of the said element the ends of the wire 17 are formed into two eyes or loops 19 and 20, the eye or loop 20 being disposed over and coinciding with the eye or loop 19, as clearly shown by Fig. 1. The negative element 15 may be of any material adapted for the purpose, but it is preferred that it be of the double copper oxid componency as disclosed in my pending application Serial Number 724,606, filed October 8, 1912, with a difference in the componency consisting in the presence of a small proportion of pure copper intermingled with the cupric and cuprous oxids. In the preferred form of negative plate as disclosed by the application above noted, cupric oxid is first produced on a copper bar by heat and then scraped off and the resultant flakes mixed with a binder of a pure sugar character and then subjected to heat to set up a coherence of the flakes and to eliminate the binder. The product thus treated is then subjected to further heat to produce cuprous oxid and the mass is pressed while at red heat and allowed to cool, thus providing a negative plate embodying solely cupric and cuprous oxids of copper in a thoroughly intermingled mass. The negative plate 15 is mounted in such manner that it may be readily removed and at the extremity thereof where the eyes or loops 19 and 20 are located a porcelain base or supporting means 21 is mounted and extends fully across the inside width of the body of the container 5 and in its lower portion has an opening 22 extending therethrough; and in this opening the longitudinal shank of a suitable L-pin 23 is mounted and projects outwardly some distance exteriorly of the adjacent end of the container body and has the greater part of the exterior portion thereof formed with screw-threads, as at 24. The vertical member of the L-pin or bolt 23 has the eyes or loops 19 and 20 fitted thereover and secured by lock nuts 25 engaging the upper screw-threaded extremity of the vertical member of the pin, and the supporting base 21 has a shoulder 26 formed at its inner side upon which the lower eye or loop 19 has bearing, said shoulder 26 being provided by means of an inwardly extending boss 27 at the center of the base 21. The base 21 is also formed with an upper ledge 28 having vertical slots 29 on opposite sides of the center thereof for a purpose which will be presently explained; and above the ledge 28 the base terminates in an upstanding stop projection or abutment 30. The outer side of the base 21 is vertically straight and between the same and the adjacent end 7 of the container body a spring washer 31 is inserted so as to set up a tight assemblage of the base with respect to the container body end when the parts are all secured in a manner which will now be explained.

In the opening 8 adjacent to the base 21 and formed in the container body end 7 for the application and exterior projection of the pin or bolt 23, is an insulating or rubber gasket 32 through which the straight longitudinal portion of the pin or bolt extends, said rubber gasket having an outer flanged head 33 which bears against an insulating washer 34 of porcelain or other material to produce a firm binding surface relatively to the end 7 of the container body around the opening 8. A thumb or wing nut 35 is mounted on the screw-threaded extremity 24 of the pin or bolt 23 and between this nut and the head 33 of the rubber washer a metal washer 36 is interposed to give a firm bearing surface to the nut when the latter is screwed home to draw the base 21 and all parts of the connection in close assembled relation and thus firmly and reliably secure the base in the container body. In view of the fact that the base 21 extends fully across the interior of the container body and the ends thereof bear against opposite portions of the container body, liability of the said base to rocking or displacing movement is obviated when the nut 35 and the coördinate parts of the fastening for the base and pin 23 are tightened up. It will be understood that the base 21 and the pin, rod or bolt 23 are first mounted within the container body as shown prior to the application of the elements thereto.

The negative element 15 is mounted within a positive element 37 which may be any suitable composition or material but is in the present instance composed of two zinc plates connected at one end by an offset bend or bow 38 extending outwardly thereover a portion of the vertical extent of the element, thus separating the zinc plates in a positive manner and leaving the space therebetween open at the opposite ends of the plates. The offset bend or bow 38, as clearly shown by Fig. 5, has an upper slot 39 and a lower vertical slot 40, the said slots respectively opening out through the upper and lower edges of the offset bend or bow. A porcelain rest block 41 is fitted in the upper slot 39, said block being provided with vertical end grooves 42, a lower longitudinal slot 43 opening out through the bottom, and an upper transverse slot 44. The slot 43 receives and fits over the portion of the offset bow or bend 38 below the lower wall of the slot 39 so that the upper edge of the rest block 41 may be depressed close to the upper edge of the offset bend or bow 38, the side walls of the slot 39 entering the vertical grooves 42. By this means a close fitting of the block 41 in the upper portion of the offset bar or bend 38 is accomplished and an insulation introduced which is engaged by the extension or bend 18 of the wire 17 of the negative element which fits in the slot 44, as clearly shown by Figs. 1 and 2, and thereby a positive support is provided for the end of the negative element opposite that associated with the porcelain base 21 through the medium of the L-shaped pin or bolt 23. It will thus be seen that the negative element is suspended between the plates composing the positive element in such manner that when the eyes or loops 19 and 20 are released from the upstanding or vertical member of the pin or bolt 23, the said negative element may be readily lifted from the cell or withdrawn from between the plates of the positive element. Each plate of the positive element 37 at the end opposite that connected by the bow or bend 38 is formed with a supporting projection 45 with a lower straight edge 46, the two projections 45 being fitted in the slots 29 of the ledge 28 of the base 21 heretofore described, as clearly shown by Figs. 1 and 2. The positive element is secured to the end 7 of the body or container 5 opposite that to which the base 21 is secured through the medium of a pin or bolt 46ª having an inner angular head 47 and an outer screw-threaded end engaged by a thumb or wing nut 48. Within the opening 8 in the adjacent end 7 of the container body a tubular rubber gasket 49 is mounted and is formed with an outer flanged head 50 in all respects similar to the gasket 32 with its head 33 heretofore described. Between the head 50 of the gasket and the adjacent end 7 of the container body an insulating washer 51 is disposed and the gasket extends therethrough, as clearly shown; and through the gasket and this washer the pin or bolt 46ª also centrally extends and has its inner extremity pushed upwardly into the slot 40 of the bow or bend 38 with the head 47 bearing snugly against the inner surface of the bow or bend adjacent to said slot. A porcelain space sleeve 52 is mounted over the pin or bolt 46ª between the bow or bend 38, and a spring washer 53, and against the flanged head 50 of the rubber gasket another washer 54 is applied and is directly engaged by the nut 48 in a manner similar to the washer 36 as hereinbefore explained. When the nut 48 is tightened up, the spring washer 53 is compressed and the bow or bend 38 of the positive element is firmly secured against movement to the container body. The L-shaped pin or bolt 23 and the bolt 46ª constitute the terminals for the negative and positive elements respectively, and under the usual mode of connecting battery cells, wires may be attached to these terminals, for instance between the nuts 35 and 48 and the washers 36 and 54. The outer screw-threaded extremities of the pin or bolt 23 and the pin or bolt 46ª are projected some distance or are long enough to make another connection, such as shown by Fig. 8, through the medium of screw-threaded tubular lengths 55, and to effect a ready application of these tubular lengths to the terminals it is proposed to form the pins and rods alternately with right and left hand screw-threads, as indicated in Fig. 8.

From the foregoing it will be readily seen that the elements 15 and 37 may be quickly removed from the container and again positioned therein or have similar elements substituted therefor if at any time such substitution may be necessary in batteries where the negative and positive elements are not precisely similar to those disclosed and preferred in the improved form of battery and embodying the particular means of removable mounting as hereinbefore explained. It is obvious that the means for mounting the elements 15 and 37 within the container body and whereby the said elements may be conveniently and expeditiously installed in the body or removed therefrom may be adopted with any form of negative and positive elements, but it is of course preferred that the double copper oxid negative element and the zinc positive element shown be used. It is preferred also that the pins or bolts 23 and 46ª be formed of copper so as to be effective as conducting means relatively to the respective elements to which they are connected.

Where portability is desired or when the battery cells are used in connection with machines which are movable and by their movement and vibration they have a tendency to laterally displace the negative element, a porcelain separator 56 is introduced in the cell, as shown by Fig. 9, said separator being hung over the negative element at about the center of the cell and constructed and arranged as shown to positively obviate any displacement of the negative element.

The electrolyte may be of any alkaline character, but it is preferred that an alkaline gelatinous electrolyte be introduced in the cell similar to that disclosed in my application Serial Number 724,607, filed October 8, 1912, and wherein vegetable starch is combined with an alkaline liquid embodying caustic soda or caustic potash. The alkaline liquid for standard battery work should have a specific gravity of 28° Beaumé, but this gravity may be changed if strong cell action and shorter life is desired. The gelatin is made by first bringing the alkaline liquid to a temperature of about 170° F. and adding the starch thereto, the proportions being between one part to eighty parts and one part to one-hundred forty parts, depending upon how hard it is desired to make the finished gelatin. In the process of making the gelatin electrolyte after the starch or dextrin is added thereto the temperature of the liquid must not exceed 200° and is preferably held at about 175° F. The alkaline solution is made from a good commercial caustic soda or caustic potash and water free from impurities in varying proportions, depending upon the battery characteristics which it is desired to obtain. After the alkaline gelatin electrolyte has been prepared it is poured into the container body in such quantity as to fully submerge the elements 15 and 17 and also the terminals thereof, as indicated in Fig. 1 at 57. The improved primary battery may be used with either a liquid or a gelatin electrolyte, and if the cell be adapted for portable service, then the gelatin electrolyte is preferred, but is not essential to the efficient action of the cell. If the cell be used on a closed circuit exclusively, the liquid electrolyte is preferable and such liquid electrolyte will then consist simply of the caustic solution, or caustic soda or caustic potash and water in proper proportions, but it has been found far preferable to use the gelatinous electrolyte, particularly in view of the advantages of such electrolyte in rendering the cell portable. Furthermore, the efficiency of the cell is very largely enhanced by the presence in the electrolyte of from one-half of one per cent. to three per cent. of zinc hydroxid. Another important feature of the improved battery is that the negative element may be renewed by recharging, particularly in view of the manner of mounting the same and whereby detachment and withdrawal thereof and a subsequent replacement may be easily accomplished.

The copper container hereinbefore described is very advantageous in view of the negative plate comprising cupric and cuprous oxids of copper and the alkaline electrolyte. It is well known that if a copper container have a zinc element disposed therein and water without any exciting means therein be poured into the container, after a time the copper will take up the zinc and eventually the zinc element will be wholly eliminated. The object of using a copper container and the negative element embodying the two copper oxids as above noted is to maintain as high voltage as possible. If a container of any other metal that does not embody copper therein was used with the negative element composed of the two copper oxids there would be two kinds of metal in the battery, which would lessen the voltage for the reason that every additional metal attacked by the exciting fluid or the alkaline electrolyte reduces the voltage proportionately. By having the negative plate composed of the copper oxids specified and the container made of pure metallic copper, the attack of the alkaline electrolyte relatively to the copper container is reduced to a minimum and in fact does not have the slightest injurious or consuming effect on the copper container, as the copper oxids of the negative plate in chemical action are preferred by the alkaline electrolyte instead of the metallic copper container and as a consequence the container while entering into electric generative action to a certain degree remains clean and in a state of preservation. If a cast iron container was used with the negative element composed of the two copper oxids described, together with a zinc plate, the voltage of the cell would be reduced by reason of the attack of the alkaline electrolyte on two different metals. Therefore, the copper container has a special advantage by coöperating with the negative element comprising the two copper oxids and the alkaline electrolyte in maintaining the voltage, and which would be the case if a container of another metal was used with the same negative element and electrolyte. Furthermore, the arrangement of the terminals of the elements below the level of the electrolyte obviates deterioration of the activity of the cell elements and the electrolyte and the rubber gaskets that are used as insulating means are so arranged that they do not contact with the electrolyte. In building up a multiple cell the same general construction will be adopted as hereinbefore disclosed in connection with the single plate or single set of elements and would involve only a plurality of the same cell elements and an increase in the dimensions and proportions of the container. In the formation of a multiple cell the porcelain base would be carried clear across the cell to hold the plates in position, especially where portability is desired, and the porcelain separator, as shown by Fig. 9, may be correspondingly increased in dimensions to accommodate the plurality of elements.

What is claimed is:

1. A primary battery comprising a copper container, a positive metallic element mounted in the copper container and directly exposed to the opposite walls of said container, a negative element composed of copper oxids associated with the positive element, the positive element being interposed between the negative element and the container, and an alkaline electrolyte, electrical generation taking place between the positive and negative elements and also between the positive element and the copper container.

2. A primary battery comprising a copper container having a removable cover, a positive element consisting of a zinc plate, a negative element composed of copper oxids, the positive element being interposed between the negative element and the container, and an alkaline electrolyte having a small percentage of zinc hydroxid primarily incorporated therein, the positive and negative elements being free of attachment to the cover and electrical generation taking place between the positive and negative elements and between the positive element and the copper container, the alkaline electrolyte having a stronger affinity for the copper oxids of the negative element than for the copper container.

3. A primary battery comprising a copper container having a cover, positive and negative elements disposed within the container, the negative element being composed of copper oxids, a porcelain base supporting the positive and negative elements at one extremity of each of the latter, the negative element being supported at its opposite extremity by and insulated from a portion of the positive element, terminals connected to the elements and extending exteriorly of the container, the negative element adapted to be readily removed and recharged and renewed, and an alkaline electrolyte wholly covering the positive and negative elements and the suspending and terminal means thereof.

4. A primary battery comprising a copper container, a cover therefor, a positive element suspended within the container and free of attachment with relation to the cover, the upper margin of the positive element being below the top of the container and the cover, a copper oxid negative element having a grooved edge engaged by a suspending wire and also held below the upper edge of the copper container, terminals connected to the positive and negative elements and extending through the body of and exteriorly of the container, and an alkaline electrolyte covering the said elements and their terminals.

5. A primary battery comprising a copper container, a cover therefor, a positive element consisting of a substantially U-shaped plate suspended within the container, a copper oxid negative element removably suspended between the parts of the positive element and having means engaging the edge thereof and resting in part upon and insulated from the upper portion of the positive element, an insulating base within the container engaged by portions of the positive element, a terminal connected to the positive element and extending exteriorly of the container through one extremity of the latter and insulated therefrom, a terminal extending through said base and the opposite extremity of the container and having the edge engaging means of the negative element detachably connected thereto, and an alkaline electrolyte covering the elements and the terminals.

6. A primary battery comprising a copper container, a cover therefor, positive and negative elements suspended in the container and free of attachment to the cover, electrical generation taking place between the positive element and the copper container and between the positive and negative elements, a separator fitted over the elements and having portions thereof between the positive element and the opposite sides of the container to hold the positive element in position, the negative element being suspended within the positive element, and an alkaline electrolyte covering the elements.

7. A primary battery comprising a copper container, a cover therefor tightly engaging the container, the cover being provided with a central venting chamber at the inner portion thereof and having a fine copper wire gauze bottom covering, the said wire gauze covering being of such mesh as to admit air therethrough into the container but prevent passage of liquid therethrough to the exterior, positive and negative elements within the container below the cover, the negative element embodying copper oxids, and a gelatinous alkaline electrolyte within the container over the positive and negative elements and prevented from passing through the cover by the said wire gauze cover.

In testimony whereof I have hereunto set my hand in presence of two subscribing witnesses.

GEORGE S. ENGLE.

Witnesses:
CHAS. S. HYER,
SADIE STANFORD WHITE.